United States Patent
Bi et al.

(10) Patent No.: US 11,874,983 B2
(45) Date of Patent: Jan. 16, 2024

(54) TOUCH PANEL, DRIVING METHOD AND DISPLAY DEVICE WITH TRANSPARENT DISPLAY AND DOUBLE-SIDED TOUCH CONTROL

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yao Bi, Beijing (CN); Hongliang Yuan, Beijing (CN); Qi Zheng, Beijing (CN); Xiaojuan Wu, Beijing (CN); Zhiqiang Zhao, Beijing (CN); Xuan Zhong, Beijing (CN); Zhangxiang Cheng, Beijing (CN); Jiaxing Wang, Beijing (CN); Donghua Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/787,732

(22) PCT Filed: May 17, 2021

(86) PCT No.: PCT/CN2021/094039
§ 371 (c)(1),
(2) Date: Jun. 21, 2022

(87) PCT Pub. No.: WO2021/244269
PCT Pub. Date: Dec. 9, 2021

(65) Prior Publication Data
US 2023/0072548 A1    Mar. 9, 2023

(30) Foreign Application Priority Data

Jun. 3, 2020   (CN) .......................... 202010495017.4

(51) Int. Cl.
*G06F 3/041*    (2006.01)
*G06F 3/044*    (2006.01)
(Continued)

(52) U.S. Cl.
CPC ............ *G06F 3/0412* (2013.01); *G06F 3/044* (2013.01); *G06F 3/0445* (2019.05);
(Continued)

(58) Field of Classification Search
CPC .... G06F 3/044; G06F 3/0412; G06F 3/04164; G06F 3/04166; G06F 3/0445; G09F 3/3648; G09G 2300/0426
See application file for complete search history.

(56) References Cited

U.S. PATENT DOCUMENTS 10,268,307 B2    4/2019   Zhao et al.
2013/0241869 A1*  9/2013   Kida ...................... G06F 3/0412
                                                     345/174
(Continued)

FOREIGN PATENT DOCUMENTS

| CN | 103425310 A | 12/2013 |
| CN | 103699269 A | 4/2014 |

(Continued)

OTHER PUBLICATIONS

International Search Report in PCT/CN2021/094039 dated Aug. 16, 2021 in English.

(Continued)

*Primary Examiner* — Liliana Cerullo
(74) *Attorney, Agent, or Firm* — Collard & Roe, P.C.; William Collard

(57) ABSTRACT

A touch panel and a driving method thereof, and a display device are provided. The touch panel includes a first sub-
(Continued)

strate and a second substrate; the first substrate includes a first electrode pattern layer, and the first electrode pattern layer includes first electrode blocks insulated from each other; the second substrate includes a second electrode pattern layer, touch lead lines, and a third electrode pattern layer; the second electrode pattern layer includes second electrode blocks insulated from each other; the second electrode blocks correspond to and are electrically connected with the first electrode blocks, respectively, and the second electrode blocks are respectively electrically connected with the touch lead lines to process an electrical signal of a touch operation; and the third electrode pattern layer includes third electrode blocks insulated from each other, and the second electrode blocks are insulated from the third electrode blocks to form touch capacitors, respectively.

20 Claims, 4 Drawing Sheets

(51) Int. Cl.
*G09G 3/3233* (2016.01)
*G09G 3/36* (2006.01)

(52) U.S. Cl.
CPC ...... *G06F 3/04164* (2019.05); *G06F 3/04166* (2019.05); *G09G 3/3233* (2013.01); *G09G 3/3648* (2013.01); *G09G 2300/0426* (2013.01); *G09G 2310/08* (2013.01); *G09G 2354/00* (2013.01)

(56) References Cited

U.S. PATENT DOCUMENTS

| | | | |
|---|---|---|---|
| 2013/0301195 A1 | 11/2013 | Yeh et al. | |
| 2015/0268759 A1* | 9/2015 | Ludden | G06F 3/04184 |
| | | | 345/174 |
| 2016/0018923 A1 | 1/2016 | Zhang et al. | |
| 2016/0048252 A1 | 2/2016 | Oh | |
| 2017/0045995 A1* | 2/2017 | Zhao | G06F 3/0412 |
| 2022/0147174 A1* | 5/2022 | Ikeda | G06F 3/0445 |

FOREIGN PATENT DOCUMENTS

| | | |
|---|---|---|
| CN | 103927043 A | 7/2014 |
| CN | 104407761 A | 3/2015 |
| CN | 105138210 A | 12/2015 |
| CN | 105759483 A | 7/2016 |
| CN | 106951118 A | 7/2017 |
| CN | 110703938 A | 1/2020 |

OTHER PUBLICATIONS

Written Opinion of the International Searching Authority in PCT/CN2021/094039 dated Aug. 16, 2021 in English.

* cited by examiner

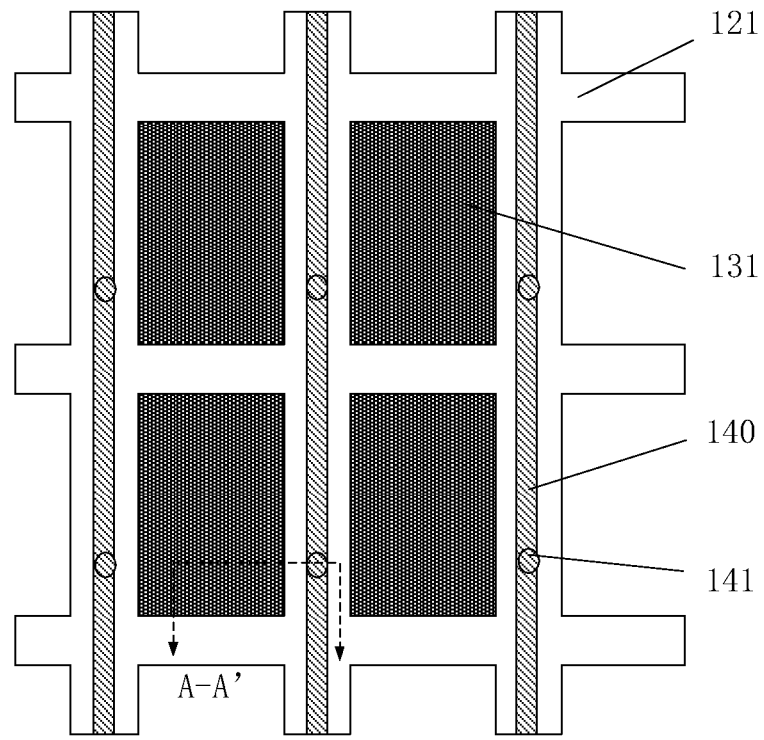

FIG. 4

In a touch phase P1, providing a periodic touch driving signal to the plurality of second electrode blocks 121 and receiving a touch detection signal from the plurality of second electrode blocks 121 through the plurality of touch lead lines 140, respectively, and providing a second common voltage signal to the plurality of third electrode blocks 131 or allowing the plurality of third electrode blocks 131 to be in a floating state

↓

In a display phase P2, providing a first common voltage signal to the plurality of first electrode blocks 111 through the plurality of touch lead lines 140, respectively, and providing a display driving signal to the plurality of third electrode blocks 131

FIG. 5

TOUCH PANEL, DRIVING METHOD AND DISPLAY DEVICE WITH TRANSPARENT DISPLAY AND DOUBLE-SIDED TOUCH CONTROL

CROSS REFERENCE TO RELATED APPLICATIONS

This application is the National Stage of PCT/CN2021/094039 filed on May 17, 2021, which claims priority under 35 U.S.C. § 119 of Chinese Application No. 202010495017.4 filed on Jun. 3, 2020, the disclosure of which is incorporated by reference.

The present application claims the priority of Chinese patent application No. 202010495017.4, filed on Jun. 3, 2020, the entire disclosure of which is incorporated herein by reference as part of the disclosure of this application.

TECHNICAL FIELD

Embodiments of the present disclosure relate to a touch panel and a driving method thereof, and a display device.

BACKGROUND

With the development of display technology, various types of display devices have been more and more widely used. These display devices can provide users with colorful images and good visual experience. The display device mainly includes a liquid crystal display (LCD) device and an organic light-emitting diode (OLED) display device, for example, which can be applied to a variety of electronic devices with display functions such as a mobile phone, a television, a laptop, etc. Furthermore, based on different needs of users for the display device, the display device can further provide various functions such as touch control at the same time.

At present, because transparent display technology can make the display device realize double-sided display, transparent display technology is more and more widely used in fields such as the smart home, smart wear, vehicle display, smart window, smart screen, etc.

SUMMARY

At least one embodiment of the present disclosure provides a touch panel, and the touch panel comprises a first substrate and a second substrate being opposite to the first substrate and overlapping with the first substrate; the first substrate comprises a first electrode pattern layer, the first electrode pattern layer comprises a plurality of first electrode blocks, and the plurality of first electrode blocks are insulated from each other and arranged in a first array with a plurality of rows and a plurality of columns; the second substrate comprises a second electrode pattern layer, a plurality of touch lead lines, and a third electrode pattern layer; the second electrode pattern layer comprises a plurality of second electrode blocks, and the plurality of second electrode blocks are insulated from each other and arranged in a second array with a plurality of rows and a plurality of columns; the plurality of second electrode blocks correspond to and are electrically connected with the plurality of first electrode blocks, respectively, and the plurality of second electrode blocks are respectively electrically connected with the plurality of touch lead lines to process an electrical signal of a touch operation; and the third electrode pattern layer comprises a plurality of third electrode blocks, the plurality of third electrode blocks are insulated from each other and arranged in a third array with a plurality of rows and a plurality of columns, and the plurality of second electrode blocks are insulated from the plurality of third electrode blocks to form a plurality of touch capacitors, respectively.

For example, in the touch panel provided by at least one embodiment of the present disclosure, the plurality of second electrode blocks and the plurality of first electrode blocks correspond to each other, and the plurality of second electrode blocks are electrically connected with the plurality of first electrode blocks in one-to-one correspondence.

For example, in the touch panel provided by at least one embodiment of the present disclosure, the second electrode pattern layer and the third electrode pattern layer are in different layers on the second substrate; and in a direction in which the first substrate and the second substrate are opposite to each other, each of the plurality of second electrode blocks at least partially overlaps with at least one third electrode block to form a touch capacitor.

For example, in the touch panel provided by at least one embodiment of the present disclosure, the first electrode pattern layer is on a side of the first substrate close to the second substrate, and the second electrode pattern layer and the third electrode pattern layer are on a side of the second substrate close to the first substrate.

For example, in the touch panel provided by at least one embodiment of the present disclosure, the second substrate is a display array substrate, the first substrate is an opposite substrate, and the first substrate and the second substrate further work together to provide a display function; the second substrate further comprises a plurality of display sub-pixels arranged in an array, and each of the plurality of display sub-pixels comprises a pixel electrode and a switch component electrically connected with the pixel electrode; and each of the plurality of third electrode blocks is further used as a pixel electrode of one display sub-pixel, and the plurality of touch lead lines further transmit a first common voltage signal for a display operation.

For example, in the touch panel provided by at least one embodiment of the present disclosure, the pixel electrode is on a side of the second electrode block close to the first substrate, and the switch component is on a side of the second electrode block away from the first substrate; and the second electrode block comprises an opening, and the pixel electrode is electrically connected to the switch component through the opening.

For example, in the touch panel provided by at least one embodiment of the present disclosure, the switch component comprises an active layer, a first electrode electrically connected to a first electrode region of the active layer, and a second electrode electrically connected to a second electrode region of the active layer, the first electrode is connected to the pixel electrode through a via hole, and an orthographic projection of the second electrode on the first substrate or the second substrate at least partially overlaps with an orthographic projection of one second electrode block on the first substrate or the second substrate.

For example, the touch panel provided by at least one embodiment of the present disclosure further comprises a controller; the controller is configured to, respectively through the plurality of touch lead lines, provide a touch driving signal to the plurality of second electrode blocks and receive a touch detection signal from the plurality of second electrode blocks in a touch phase; and the plurality of third electrode blocks are configured to receive a second common voltage signal or be floated in the touch phase to enable the touch operation.

For example, in the touch panel provided by at least one embodiment of the present disclosure, the controller is further configured to, respectively through the plurality of touch lead lines, provide the first common voltage signal to the plurality of second electrode blocks in a display phase.

For example, the touch panel provided by at least one embodiment of the present disclosure further comprises a plurality of conductive blocks, the plurality of conductive blocks are between the first substrate and the second substrate, and each of the plurality of conductive blocks is in electrical contact with a corresponding first electrode block and a corresponding second electrode block, respectively, to allow the corresponding first electrode block to be electrically connected to the corresponding second electrode block.

For example, in the touch panel provided by at least one embodiment of the present disclosure, the first substrate further comprises a black matrix, the black matrix comprises a plurality of black matrix strips, the plurality of black matrix strips are configured to define a plurality of opening regions, and an orthographic projection of the conductive block on the first substrate or the second substrate at least partially overlaps with an orthographic projection of the black matrix strip on the first substrate or the second substrate.

For example, in the touch panel provided by at least one embodiment of the present disclosure, the conductive block comprises a conductive ball.

For example, the touch panel provided by at least one embodiment of the present disclosure further comprises a first insulating layer, and the first insulating layer covers other portions of the second electrode pattern layer except for a portion of the second electrode pattern layer in contact with the plurality of conductive blocks.

For example, in the touch panel provided by at least one embodiment of the present disclosure, a height of the conductive block in a direction in which the first substrate and the second substrate are opposite to each other is greater than a minimum distance between the first substrate and the second substrate.

For example, in the touch panel provided by at least one embodiment of the present disclosure, the plurality of touch lead lines are on a side of the second electrode pattern layer away from the first substrate, and the plurality of touch lead lines are electrically connected with the plurality of second electrode blocks through a plurality of via holes, respectively.

For example, in the touch panel provided by at least one embodiment of the present disclosure, an orthographic projection of one first electrode block on the first substrate or the second substrate at least partially overlaps with an orthographic projection of a corresponding second electrode block on the first substrate or the second substrate.

For example, in the touch panel provided by at least one embodiment of the present disclosure, the first electrode pattern layer, the second electrode pattern layer, and the third electrode pattern layer are transparent electrode layers.

For example, in the touch panel provided by at least one embodiment of the present disclosure, the second electrode pattern layer and the third electrode pattern layer are in an identical layer.

At least one embodiment of the present disclosure further provides a display device, and the display device comprises the touch panel according to any one of the embodiments of the present disclosure.

At least one embodiment of the present disclosure further provides a driving method of the touch panel according to any one of the embodiments of the present disclosure, and the driving method comprises: in a touch phase, providing a periodic touch driving signal to the plurality of second electrode blocks and receiving a touch detection signal from the plurality of second electrode blocks through the plurality of touch lead lines, respectively, and providing a second common voltage signal to the plurality of third electrode blocks or allowing the plurality of third electrode blocks to be in a floating state.

BRIEF DESCRIPTION OF THE DRAWINGS

In order to clearly illustrate the technical solutions of the embodiments of the present disclosure, the drawings of the embodiments will be briefly described in the following. It is obvious that the described drawings are only related to some embodiments of the present disclosure and thus are not limitative to the present disclosure.

FIG. 4 is a schematic diagram of a partial planar structure of a touch panel provided by at least one embodiment of the present disclosure;

FIG. 5 is a flowchart of a driving method of a touch panel provided by at least one embodiment of the present disclosure;

DETAILED DESCRIPTION

Figure 1A:
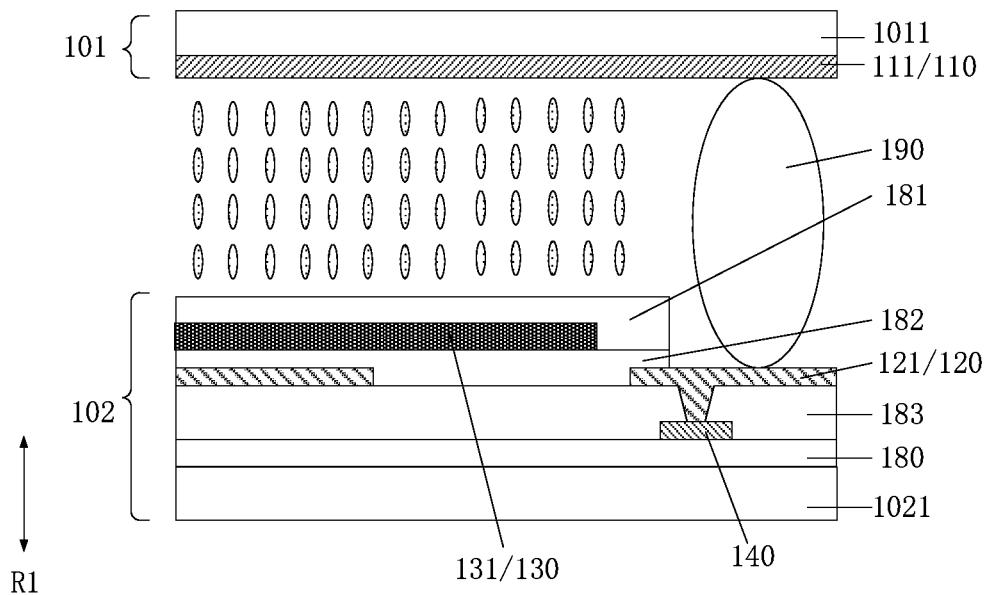
FIG. 1A is a schematic diagram of a partial cross-sectional structure of a touch panel provided by at least one embodiment of the present disclosure.

In order to make objects, technical details and advantages of the embodiments of the present disclosure apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect," "connected," "coupled," etc., are not intended to define a physical connection or mechanical connection, but may include an electrical connection, directly or indirectly. "On," "under," "right," "left," and the like are only used to indicate relative position relationship, and when the position of the object which is described is changed, the relative position relationship may be changed accordingly.

At present, when the user uses a touch display device with single-sided touch control and single-sided display, the finger needs to perform the touch operation on the display side of the touch display device, which may affect the user's viewing field and reduce the user experience. When using transparent display technology to realize double-sided display, at present, the user experience is poor when the touch function is only provided on one display side. Alternatively, when the touch function is provided on both display sides, the thickness of the touch display panel is relatively large. In addition, the existing touch devices with double-sided touch functions often have many problems, such as poor touch performance, low touch sensitivity, large thickness, complex process, high cost, etc., and it is not only difficult to meet the use needs of users but also difficult to realize mass production and application.

At least one embodiment of the present disclosure provides a touch panel, and the touch panel includes a first substrate and a second substrate being opposite to the first substrate and overlapping with the first substrate; the first substrate includes a first electrode pattern layer, the first electrode pattern layer includes a plurality of first electrode blocks, and the plurality of first electrode blocks are insulated from each other and arranged in a first array with a plurality of rows and a plurality of columns; the second substrate includes a second electrode pattern layer, a plurality of touch lead lines, and a third electrode pattern layer; the second electrode pattern layer includes a plurality of second electrode blocks, and the plurality of second electrode blocks are insulated from each other and arranged in a second array with a plurality of rows and a plurality of columns; the plurality of second electrode blocks correspond to and are electrically connected with the plurality of first electrode blocks, respectively, and the plurality of second electrode blocks are respectively electrically connected with the plurality of touch lead lines to process an electrical signal of a touch operation; and the third electrode pattern layer includes a plurality of third electrode blocks, the plurality of third electrode blocks are insulated from each other and arranged in a third array with a plurality of rows and a plurality of columns, and the plurality of second electrode blocks are insulated from the plurality of third electrode blocks to form a plurality of touch capacitors, respectively.

The touch panel provided by the at least one embodiment of the present disclosure can realize double-sided touch control, so that the user can realize the touch operation from both sides of the touch panel. The touch panel is not only simple in structure, but also convenient to improve the flexibility and sensitivity of the touch operation. Thus, for example, when the touch panel is further combined with the display function to realize the double-sided touch display panel, the user can perform the touch operation on the display side and/or the back side, which is opposite to the display side, according to actual needs, so as to reduce or avoid the adverse impact on the viewing effect of the screen when the user performs the touch operation, and further to improve the user experience. For another example, when the touch panel is further combined with the display function to realize the double-sided touch display panel, the user can perform the touch operation on the first display side and/or the second display side, which is opposite to the first display side, according to actual needs, so as to improve the flexibility and sensitivity of the touch operation.

Moreover, in the touch panel provided by the at least one embodiment of the present disclosure, the first electrode block on the first substrate is electrically connected with the second electrode block on the opposite second substrate for processing the electrical signal of the touch operation. Therefore, the performance and sensitivity of double-sided touch control of the touch panel can be improved through the first electrode block and the second electrode block which are located at opposite positions, so as to improve the user experience and further to facilitate optimizing the touch structure of the touch panel, thereby improving the preparation process of the touch panel, reducing the preparation cost of the touch panel, and reducing the size of the touch panel in the thickness direction, which is conducive to the realization of thin design and mass production and application.

In the following, the embodiments of the present disclosure will be described in detail with reference to the accompanying drawings. It should be noted that the same reference numerals in different drawings will be used to refer to the same components which have been described.

Figure 2:
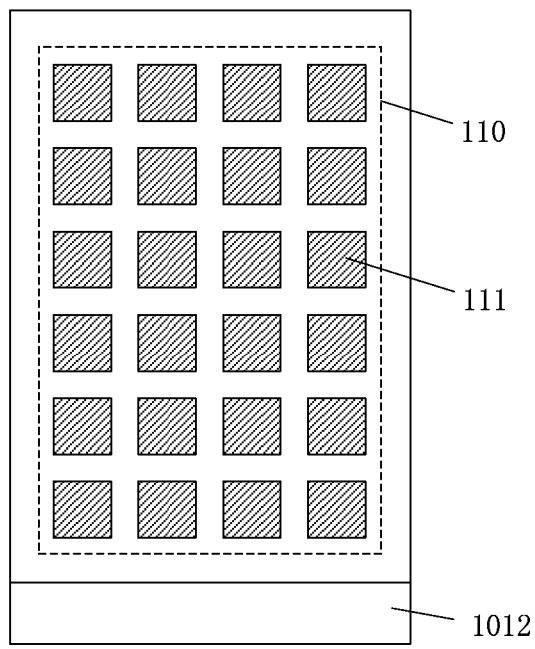
FIG. 2 is a schematic diagram of a partial planar structure of a first substrate of a touch panel provided by at least one embodiment of the present disclosure.
Figure 3:
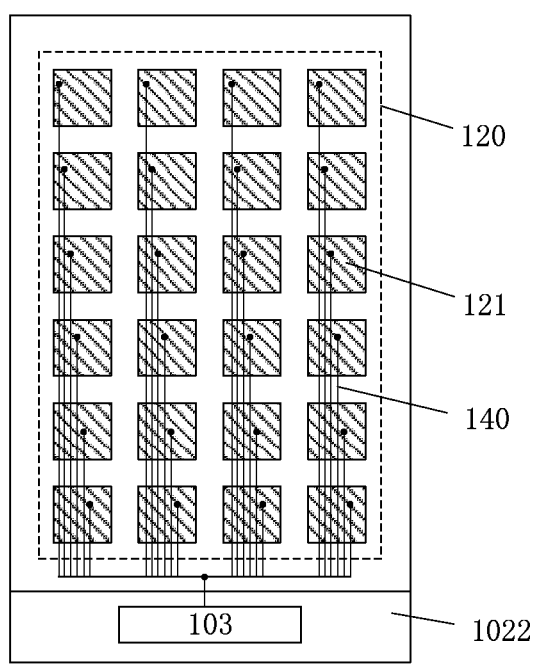
FIG. 3 is a schematic diagram of a partial planar structure of a second substrate of a touch panel provided by at least one embodiment of the present disclosure.

FIG. 1A is a schematic diagram of a partial cross-sectional structure of a touch panel provided by at least one embodiment of the present disclosure, FIG. 2 is a schematic diagram of a partial planar structure of a first substrate of a touch panel provided by at least one embodiment of the present disclosure, and FIG. 3 is a schematic diagram of a partial planar structure of a second substrate of a touch panel provided by at least one embodiment of the present disclosure. For example, FIG. 2 shows a planar distribution of a plurality of first electrode blocks of the first substrate, and FIG. 3 shows a planar distribution of a plurality of second electrode blocks of the second substrate.

In some embodiments of the present disclosure, as illustrated in FIG. 1A, FIG. 2 and FIG. 3, the touch panel 10 includes a first substrate 101 and a second substrate 102 which is opposite to and overlaps with the first substrate 101. For example, the first substrate 101 and the second substrate 102 are separated by a predetermined distance to form a panel with an internal accommodation space. The first substrate 101 includes a first electrode pattern layer 110, and the first electrode pattern layer 110 includes a plurality of first electrode blocks 111 which are insulated from each other and arranged in a first array with a plurality of rows and a plurality of columns. The second substrate 102 includes a second electrode pattern layer 120, a plurality of touch lead lines 140, and a third electrode pattern layer 130. The second electrode pattern layer 120 includes a plurality of second electrode blocks 121 which are insulated from each other and arranged in a second array with a plurality of rows and a plurality of columns. The plurality of second electrode blocks 121 respectively correspond to and are electrically connected with the plurality of first electrode blocks 111, and the plurality of second electrode blocks 121 are electrically connected with the plurality of touch lead lines 140 to process an electrical signal of a touch operation.

The third electrode pattern layer 130 includes a plurality of third electrode blocks 131 which are insulated from each other and arranged in a third array with a plurality of rows and a plurality of columns, and the plurality of second electrode blocks 121 are insulated from the plurality of third electrode blocks 131 to form a plurality of touch capacitors, respectively.

In the touch panel 10 provided by the above embodiment of the present disclosure, the first electrode block 111 on the first substrate 101 is electrically connected to the second electrode block 121 on the opposite second substrate 102 for processing the electrical signal of the touch operation, so that when the user performs the touch operation from the side close to the first substrate 101, for example, the capacitance formed between the user's finger and the ground changes the amount of charge on the first electrode block 111, and the potential of the first electrode block 111 changes, so that the potential of the second electrode block 121 which is electrically connected to the first electrode block 111 changes accordingly, and the touch capacitance formed between the second electrode block 121 and the corresponding third electrode block 131 changes. Moreover, when the user performs the touch operation from the side close to the second substrate 102, the capacitance formed between the user's finger and the ground is directly superimposed on the touch capacitance formed between the second electrode block 121 and the corresponding third electrode block 131, so that the touch capacitance formed between the second electrode block 121 and the corresponding third electrode block 131 changes accordingly. The third electrode block 131 is applied with a fixed voltage (for example, is grounded) or is floated during the touch operation. For example, the third electrode block 131 may be directly connected or indirectly connected (for example, through a switch component) to other lead lines (not shown) different from the touch lead line 140, so that the fixed voltage can be applied.

Therefore, whether the user performs the touch operation from the side close to the first substrate 101 or from the side close to the second substrate 102, the touch detection can be implemented by detecting the change of the touch capacitance between the second electrode block 121 and the corresponding third electrode block 131 through the touch lead line 140. Therefore, the touch panel 10 provided by the above embodiment of the present disclosure enables the user to perform the touch operation from both sides of the touch panel 10 to achieve double-sided touch control, so as to improve the touch flexibility and sensitivity of the touch panel 10 and improve the user experience.

Further, in the touch panel 10 provided by the above embodiment of the present disclosure, because the plurality of second electrode blocks 121 respectively correspond to and are electrically connected with the plurality of first electrode blocks 111, according to actual operation requirements, for example, when the touch operation is performed, the transmission of required electrical signals (such as a touch driving signal and a touch detection signal) can be realized through the touch lead line electrically connected with the second electrode block 121, without providing a lead line directly connected with the first electrode block 111. Thus, the structure of the touch panel 10 can be optimized, and the size of the touch panel 10 in the thickness direction can be reduced, so as to improve the preparation process of the touch panel 10, reduce the preparation cost of the touch panel 10, and further facilitate the realization of thin design and mass production and application.

It should be noted that in the embodiments of the present disclosure, when the user performs the touch operation on the touch panel 10, the user can touch from the side close to the first substrate 101 and/or the side close to the second substrate 102 through the finger, or through other suitable media such as a stylus. The embodiments of the present disclosure are not limited in this aspect.

In some embodiments of the present disclosure, as illustrated in FIG. 1A, FIG. 2 and FIG. 3, the plurality of second electrode blocks 121 and the plurality of first electrode blocks 111 are electrically connected with each other in one-to-one correspondence, that is, the number of the second electrode blocks 121 is identical to the number of the first electrode blocks 111, and the second electrode blocks 121 are in one-to-one correspondence with the first electrode blocks 111, so that the distribution of electrode blocks on the first substrate 101 and on the second substrate 102 can be relatively uniform, the touch operation performed on the side close to the first substrate 101 and the touch operation performed on the side close to the second substrate 102 may have the same accuracy, and the performance and sensitivity of the double-sided touch control of the touch panel 10 can be improved.

It should be noted that in other embodiments of the present disclosure, according to the actual needs, one second electrode block 121 may be electrically connected with multiple first electrode blocks 111. For example, because the number of structures or components provided on the first substrate 101 is less than the number of those provided on the second substrate 102, the number of the first electrode blocks 111 may be set to be greater than the number of the second electrode blocks 121, and the touch operation performed on the side close to the first substrate 101 may have higher accuracy than the touch operation performed on the side close to the second substrate 102, so that the sensitivity and accuracy of the touch control on the side close to the first substrate 101 can be further improved. Alternatively, in some other embodiments of the present disclosure, according to the actual needs, one first electrode block 111 may be electrically connected with multiple second electrode blocks 121. Therefore, the number of second electrode blocks 121 may be set to be greater than the number of first electrode blocks 111, and the touch operation performed on the side close to the second substrate 102 may have higher accuracy than the touch operation performed on the side close to the first substrate 101, so as to further improve the sensitivity and accuracy of the touch control on the side close to the second substrate 102. The embodiments of the present disclosure do not limit the above arrangements.

For example, as illustrated in FIG. 1A, on the second substrate 102, the second electrode pattern layer 120 and the third electrode pattern layer 130 are located in different layers. In the direction R1 in which the first substrate 101 and the second substrate 102 are opposite to each other, each of the plurality of second electrode blocks 121 at least partially overlaps with at least one third electrode block 131 to form a touch capacitor.

For example, FIG. 4 is a schematic diagram of a partial planar structure of a touch panel provided by at least one embodiment of the present disclosure. For example, FIG. 4 shows the overlapping relationship of the second electrode block 121 with the third electrode block 131 and the touch lead line 140 in FIG. 1A in the direction R1.

For example, FIG. 1A may be a partial cross-sectional view taken along a line A-A' shown in FIG. 4. It should be noted that for clarity and simplicity, only the second electrode block 121, the third electrode block 131, and the touch lead line 140 are shown in FIG. 4, and structures such as an insulating layer are omitted.

In some embodiments of the present disclosure, as illustrated in FIG. 4, each of the plurality of second electrode blocks 121 may at least partially overlap with a plurality of third electrode blocks 131 to form a touch capacitor. For example, in FIG. 4, one second electrode block 121 overlaps with at least four third electrode blocks 131. Thus, while ensuring that the touch panel 10 realizes the touch function, it can appropriately reduce the number of second electrode blocks 121 and simplify the structure of the touch panel 10, thereby optimizing the preparation process of the touch panel 10 and reducing the preparation cost of the touch panel 10.

It should be noted that in the embodiments of the present disclosure, the number of third electrode blocks 131 overlapped with one second electrode block 121 is not limited, as long as the touch capacitor can be formed between each of the plurality of second electrode blocks 121 and the corresponding third electrode blocks 131.

In addition, in the case that the touch panel 10 has a display function, for example, the third electrode block 131 may be further used as a pixel electrode (referring to the corresponding content of the touch panel 10 shown in FIG. 1B later). Because the second electrode block 121 needs to be electrically connected to the first electrode block 111 on the first substrate 101, making the number of second electrode blocks 121 appropriately less than the number of pixel electrodes located on the same substrate can improve the opening rate of pixels, thereby improving the effect of the display image while ensuring that the touch panel 10 realizes the touch function.

It should be noted that in other embodiments of the present disclosure, each of the plurality of second electrode blocks 121 may also correspond to and at least partially overlap with each of the plurality of third electrode blocks 131 to form a touch capacitor, so as to further improve the touch performance and sensitivity of the touch panel 10. The embodiments of the present disclosure are not limited in this aspect.

For example, in the embodiments of the present disclosure, the plurality of touch lead lines 140 are located on the side of the second electrode pattern layer 120 away from the first substrate 101, and are electrically connected with the plurality of second electrode blocks 121 through a plurality of via holes 141, respectively, so that the touch panel 10 can realize the transmission of electrical signals on the second electrode blocks 121 through the touch lead lines 140.

In some embodiments of the present disclosure, as illustrated in FIG. 1A, the first electrode pattern layer 110 is located on the side of the first substrate 101 close to the second substrate 102, and the second electrode pattern layer 120 and the third electrode pattern layer 130 are located on the side of the second substrate 102 close to the first substrate 101. Thus, the size of the structure or component connecting the second electrode block 121 and the first electrode block 111 can be reduced, and the interference of other structures or components, which are located on the second substrate 102, on the touch capacitance formed between the second electrode block 121 and the third electrode block 131 can be alleviated or avoided, so as to further improve the performance and sensitivity of touch control.

For example, the first substrate 101 further includes a base substrate 1011, the second substrate 102 further includes a base substrate 1021, the first electrode pattern layer 110 is located on the side of the base substrate 1011 close to the second substrate 102, and the second electrode pattern layer 120 and the third electrode pattern layer 130 are located on the side of the base substrate 1021 close to the first substrate 101. Thus, in the case of ensuring that the touch panel 10 realizes the touch function, the structures such as the first electrode pattern layer 110, the second electrode pattern layer 120, and the third electrode pattern layer 130 provided between the base substrate 1011 and the base substrate 1021, which are opposite to each other, can also be protected.

In other embodiments of the present disclosure, the first electrode pattern layer 110 may also be located on the side of the first substrate 101 away from the second substrate 102, for example, on the side of the base substrate 1011 away from the second substrate 102, thereby improving the sensitivity and accuracy of the touch operation from the side close to the first substrate 101. Alternatively, the second electrode pattern layer 120 and the third electrode pattern layer 130 may also be located on the side of the second substrate 102 away from the first substrate 101, for example, on the side of the base substrate 1021 away from the first substrate 101, thereby improving the sensitivity and accuracy of the touch operation from the side close to the second substrate 102. Alternatively, in other embodiments of the present disclosure, the second electrode pattern layer 120 and the third electrode pattern layer 130 may be respectively located on both sides of the second substrate 102. The embodiments of the present disclosure do not limit the arrangement manner of the above electrode patterns.

It should be noted that in the embodiments of the present disclosure, the third electrode block 131 is located on the side of the second electrode block 121 close to the first substrate 101, while in other embodiments of the present disclosure, in the case that the second electrode pattern layer 120 and the third electrode pattern layer 130 are located in different layers, according to actual needs, the third electrode block 131 may also be provided on the side of the second electrode block 121 away from the first substrate 101, which is not limited by the embodiments of the present disclosure.

In some embodiments of the present disclosure, as illustrated in FIG. 1A, the touch panel 10 further includes a plurality of conductive blocks 190, the plurality of conductive blocks 190 are located between the first substrate 101 and the second substrate 102, and each of the plurality of conductive blocks 190 is in electrical contact with a corresponding first electrode block 111 and a corresponding second electrode block 112, respectively, so as to electrically connect the corresponding first electrode block 111 with the corresponding second electrode block 112, thereby realizing the transmission of electrical signals between the first electrode block 111 and the second electrode block 112. In addition, the conductive block 190 can at least partially play a supporting role for maintaining the spacing between the first substrate 101 and the second substrate 102.

In some embodiments of the present disclosure, the touch panel 10 may further include a display function. Therefore, for example, by realizing double-sided touch control, the user can perform the touch operation on the display side and/or the back side, which is opposite to the display side, of the touch panel 10 according to actual needs, so as to reduce or avoid the adverse impact that the user may have on the viewing effect of the screen when performing the touch operation, and improve user experience. For another example, when the touch panel 10 is further combined with the display function to realize the double-sided touch display panel, the user can perform the touch operation on the first display side and/or the second display side opposite to the first display side according to actual needs, thereby improving flexibility and sensitivity of the touch operation.

Figure 1B:
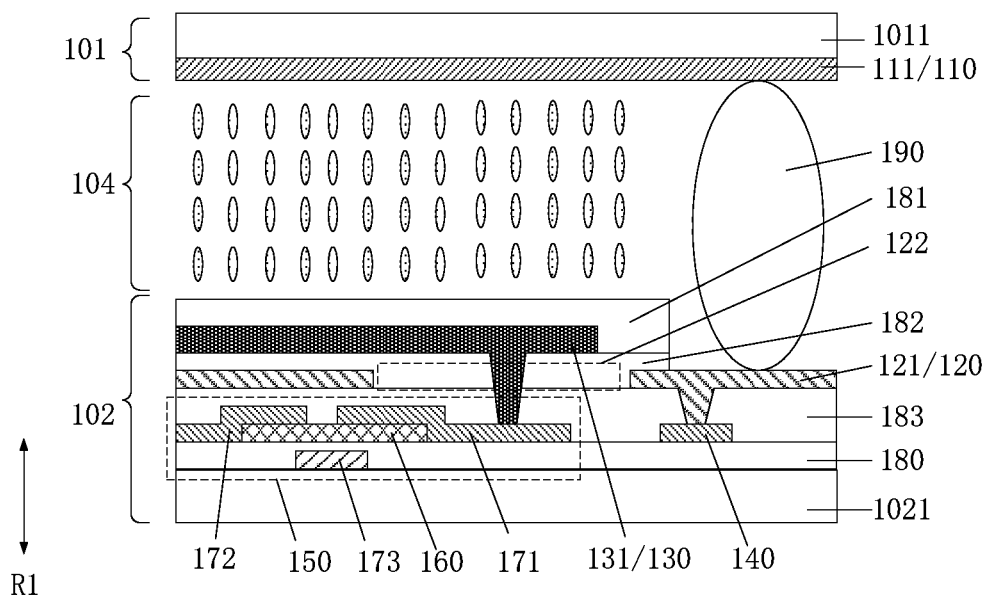
FIG. 1B is a schematic diagram of a partial cross-sectional structure of another touch panel provided by at least one embodiment of the present disclosure.

FIG. 1B is a schematic diagram of a partial cross-sectional structure of another touch panel provided by at least one embodiment of the present disclosure. For example, compared with the touch panel 10 shown in FIG. 1A, FIG. 1B shows a partial cross-sectional structure of the touch panel 10 including a display function. It should be noted that other parts of the touch panel 10 shown in FIG. 1B, except for the display structure or component used to realize the display function, such as the switch component 150, are basically the same or similar to those of the touch panel 10 shown in FIG. 1A, and details may be referred to the corresponding description of the touch panel 10 shown in FIG. 1A above, which will not be repeated here.

For example, as illustrated in FIG. 1B, the second substrate 102 may be a display array substrate, the first substrate 101 is an opposite substrate, and the first substrate 101 and the second substrate 102 are combined to provide a display panel, so that the first substrate 101 and the second substrate 102 may further work together to provide a display function. The second substrate 102 further includes a pixel array, the pixel array includes a plurality of display sub-pixels arranged in an array, and each of the plurality of display sub-pixels includes a pixel electrode and a switch component 150 electrically connected with the pixel electrode. For example, each of the plurality of third electrode blocks 131 is further used as the pixel electrode of one display sub-pixel, that is, the pixel electrode 131, and the plurality of touch lead lines 140 further transmit a first common voltage signal for a display operation. The display array substrate further includes a gate line for providing a scanning signal for the pixel array and a data line (not shown) for providing a data signal. For example, the switch component of the display sub-pixel is connected with the gate line corresponding to the row in which the switch component is located and the data line corresponding to the row in which the switch component is located, so that the data signal provided by the data line can be applied to the pixel electrode under the control of the scanning signal provided by the gate line.

Further, in the case of enabling the touch panel 10 to realize both the display function and the touch function at the same time, the third electrode block 131 can be used to form a touch capacitor with the second electrode block 121 to perform the touch operation in the touch phase, and can be further used as the pixel electrode to perform the display operation in the display phase, without providing a separate third electrode block 131 for touch control. The first electrode block 111 is used to transmit an electrical signal for touch control on one side close to the first substrate 101 in the touch phase, and receives, through the electrically connected second electrode block 121, the first common voltage signal provided by the touch lead line 140 to perform the display operation in the display phase. For example, in the display phase, the first electrode block 111 may be further used as a common electrode cooperating with the pixel electrode to perform the display operation, without providing a separate common electrode for display. Thus, the display structure and touch structure of the touch panel 10 can be optimized, the size of the touch panel 10 in the thickness direction can be reduced, the preparation process of the touch panel 10 can be improved, and the preparation cost of the touch panel 10 can be reduced, thereby facilitating the realization of thin design and mass production and application.

In addition, in some embodiments of the present disclosure, because the first electrode block 111 is electrically connected with the second electrode block 121, in the case that the first electrode block 111 is further used as a common electrode cooperating with the pixel electrode, for example, in the display phase, the required first common voltage signal can be provided to the first electrode block 111 through the touch lead line 140, so that there is no need to separately provide a lead line or the like connected to the first electrode block 111. Thus, the structure of the touch panel 10 can be further optimized, the preparation process of the touch panel 10 can be improved, and the preparation cost of the touch panel 10 can be reduced.

In some embodiments of the present disclosure, as illustrated in FIG. 1B, FIG. 2 and FIG. 3, the touch panel 10 further includes a controller 103, the controller 103 is configured to provide a touch driving signal to the plurality of second electrode blocks 121 and receive a touch detection signal from the plurality of second electrode blocks 121 through the plurality of touch lead lines 140, respectively, in the touch phase, the plurality of third electrode blocks 131 are configured to receive the second common voltage signal or be floated in the touch phase to realize the touch operation, and the touch operation is a self-capacitive touch operation mode. Thus, the touch panel 10 realizes the touch function through the cooperation of the second electrode block 121 and the third electrode block 131.

In some embodiments of the present disclosure, the controller 103 is further configured to provide a first common voltage signal to the plurality of second electrode blocks 121 through the plurality of touch lead lines 140 in the display phase, so as to reduce or avoid the possible adverse effect of the second electrode block 121 on the display effect, and further allow the first common voltage signal to be applied to the first electrode block 111 electrically connected to the second electrode block 121 to allow the first electrode block 111 to be further used as a common electrode in the display phase to perform the display operation.

For example, the controller 103 may be implemented as any applicable circuit or chip, or as a combination of software, hardware and firmware, which is not limited by the embodiments of the present disclosure.

For example, as illustrated in FIG. 3, the controller 103 may be arranged on the second substrate 102 and located in, for example, a frame region 1022 of the second substrate 102. For example, the frame region 1022 at least partially surrounds the display region or the touch region of the second substrate 102. It should be noted that the frame region 1022 of the second substrate 102 may also be provided with other required structures or components, such as a flexible circuit board, or the controller 103 may also be arranged on the flexible circuit board, and the flexible circuit board is electrically connected to the frame region 1022 through a bonding manner. The above contents may refer to the conventional design in the art and will not be repeated here.

It should be noted that the first substrate 101 may also include a frame region 1012 corresponding to the frame region 1022 of the second substrate 102. The specific content may refer to the conventional design in the art and will not be repeated here.

For example, as illustrated in FIG. 1B, the pixel electrode 131 (that is, the third electrode block 131) may be located on the side of the second electrode block 121 close to the first substrate 101, and the switch component 150 may be located on the side of the second electrode block 121 away from the first substrate 101. The second electrode block 121 includes an opening 122, the pixel electrode 131 is electrically connected with the switch component 150 through the opening 122 to receive the corresponding electrical signal.

In some embodiments of the present disclosure, as illustrated in FIG. 1B, the switch component 150 may be a thin film transistor, the thin film transistor includes an active layer 160, a first electrode 171 electrically connected to a first electrode region of the active layer 160, and a second electrode 172 electrically connected to a second electrode region of the active layer 160. The first electrode 171 is connected with the pixel electrode 131 through a via hole. For example, the second electrode 172 is connected with a corresponding data line, and the second electrode 172 is formed in the same layer as the corresponding data line. An orthographic projection of the second electrode 172 on the first substrate 101 or the second substrate 102 at least partially overlaps with an orthographic projection of one second electrode block 121 on the first substrate 101 or the second substrate 102, that is, the second electrode 172 and one second electrode block 121 at least partially overlap with each other in the direction R1 in which the first substrate 101 and the second substrate 102 are opposite to each other. Therefore, in the display phase of the touch panel 10, the second electrode block 121 can reduce or avoid the formation of a capacitance between the electrical signal on the second electrode 172 and the first electrode block 111, thereby reducing or avoiding adverse effects on the display.

The switch component 150 further includes a gate electrode 173 and a gate insulating layer 180 located on the side of the gate electrode 173 close to the first substrate 101. The gate electrode 173 is electrically connected to a corresponding gate line, for example, the gate electrode 173 and the corresponding gate line are located in the same layer, and the gate electrode 173 is integrally formed with the corresponding gate line. The active layer 160 is located on the side of the gate insulating layer 180 close to the first substrate 101.

It should be noted that, in the embodiment shown in FIG. 1B, the switch component 150 adopts a bottom-gate structure, while in other embodiments of the present disclosure, the switch component 150 may also adopt a top-gate structure, that is, the gate electrode 173 and the gate insulating layer 180 may also be located on the side of the active layer 160 close to the first substrate 101, which is not limited by the embodiments of the present disclosure.

It should be noted that, in the embodiments shown in FIG. 1A and FIG. 1B, the gate insulating layer 180 may also serve as an insulating layer covering the surface of the base substrate 1021, so as to reduce or avoid such as impurities in the base substrate 1021 from adversely affecting the structures such as the touch lead lines 140 disposed on the base substrate 1021.

In some embodiments of the present disclosure, as illustrated in FIG. 1B, the touch lead line 140 may be formed in the same layer as the first electrode 171 and the second electrode 172, and thus formed in the same layer as the data line. Alternatively, in other embodiments, the touch lead line 140 may also be formed in the same layer as the gate electrode 173, and thus formed in the same layer as the gate line. The embodiments of the present disclosure are not limited in this aspect.

As described above, the touch panel 10 further includes a plurality of conductive blocks 190, and the plurality of conductive blocks 190 are located between the first substrate 101 and the second substrate 102 to realize the electrical signal transmission between the first electrode block 111 and the second electrode block 112. In the display panel of this embodiment (that is, the touch panel 10 with the display function shown in FIG. 1B), the conductive blocks 190 may be implemented as conductive spacers.

In this embodiment, the first substrate 101 is used as the opposite substrate opposite to the array substrate in the display panel. For example, the first substrate 101 may be a color filter substrate, including a color filter layer. The color filter layer includes a plurality of color filter sub-pixels (units) arranged in an array. For example, the plurality of color filter sub-pixels (units) correspond to the display sub-pixels on the array substrate in one-to-one correspondence. The plurality of color filter sub-pixels include, for example, red sub-pixels, green sub-pixels, blue sub-pixels, etc.

In some embodiments of the present disclosure, the first substrate 101 may further include a black matrix, the black matrix includes a plurality of black matrix strips, and the plurality of black matrix strips are configured to define a plurality of opening regions. For example, the black matrix and the color filter layer are located in the same layer or in different layers, and the plurality of opening regions of the black matrix correspond to the color filter sub-pixels in one-to-one correspondence, for example, to respectively expose the corresponding color filter sub-pixels (for example, the red sub-pixels, green sub-pixels and blue sub-pixels). The orthographic projection of the conductive block 190, arranged between the first substrate 101 and the second substrate 102, on the first substrate 101 or the second substrate 102 at least partially overlaps with the orthographic projection of the black matrix strip on the first substrate 101 or the second substrate 102, so that the space occupied by the conductive block 190 in the opening region can be reduced or avoided, thereby improving the pixel opening rate of the touch panel 10 for display.

In some embodiments of the present disclosure, as illustrated in FIG. 1A and FIG. 1B, the conductive block 190 may include a conductive ball. For example, the conductive block 190 adopts a spherical structure, which can ensure that the plurality of conductive blocks 190 can be relatively in uniform distribution between the first substrate 101 and the second substrate 102, so as to improve the uniformity and stability of the electrical connection between the first electrode block 111 and the second electrode block 121. For example, the conductive ball may be formed by using a metal particle, and the metal may be a simple substance or alloy. Alternatively, the conductive ball may be formed by a particle with a composite shell structure. The particle includes, for example, a core of resin, the surface of the core is covered with a conductive layer, and the conductive layer may include metal, graphite, etc.

It should be noted that in some other embodiments of the present disclosure, the conductive block 190 may adopt other suitable shapes, such as a cylindrical shape or a strip shape, which is not limited by the embodiments of the present disclosure.

In some embodiments of the present disclosure, the height of the conductive block 190 in the direction R1 in which the first substrate 101 and the second substrate 102 are opposite to each other is greater than the minimum distance between the first substrate 101 and the second substrate 102 (for example, the cell gap of the display panel), so that the conductive block 190 provides an electrical connection and further plays a supporting role between the first substrate 101 and the second substrate 102 at the same time, so as to further improve the overall performance of the touch panel 10.

In some embodiments of the present disclosure, as illustrated in FIG. 1A and FIG. 1B, the touch panel 10 further includes a first insulating layer 181, and the first insulating layer 181 covers other parts of the second electrode pattern layer 120 except for the part of the second electrode pattern layer 120 in contact with the plurality of conductive blocks 190, so as to avoid electrical contact between the conductive block 190 and such as the third electrode block 131 or other structures, thereby improving the stability of the touch panel 10.

For example, as illustrated in FIG. 1A and FIG. 1B, in the case that the third electrode pattern layer 130 is located on the side of the second electrode pattern layer 120 close to the first substrate 101, the first insulating layer 181 covers the surface of the third electrode pattern layer 130 to avoid electrical contact between the third electrode block 131 and other structures.

For example, as illustrated in FIG. 1A and FIG. 1B, the touch panel 10 further includes a second insulating layer 182 and a third insulating layer 183. The second insulating layer 182 is located between the second electrode pattern layer 120 and the third electrode pattern layer 130 to allow the second electrode block 121 to be insulated from the third electrode block 131. The third insulating layer 183 covers the touch lead line 140, and the second electrode block 121 is connected to the touch lead line 140 through a via hole (such as the via hole 141 shown in FIG. 4) penetrating the third insulating layer 183.

It should be noted that, for example, other insulating layers or other interlayer structures may also be arranged between the second electrode block 121 and the touch lead line 140, and the electrical connection can be realized through the via hole design penetrating the other insulating layers or other interlayer structures. The embodiments of the present disclosure are not limited in this aspect.

For example, in the embodiment shown in FIG. 1B, the third insulating layer 183 is located between the second electrode pattern layer 120 and the switch component 150, and the pixel electrode 131 (that is, the third electrode block 131) is connected to the switch component 150 through a via hole penetrating the second insulating layer 182 and the third insulating layer 183.

It should be noted that, for example, other insulating layers or other interlayer structures may also be arranged between the pixel electrode 131 and the switch component 150, and the electrical connection may be realized through the via hole design penetrating the other insulating layers or other interlayer structures. The embodiments of the present disclosure are not limited in this aspect.

In some embodiments of the present disclosure, as illustrated in FIG. 1A to FIG. 3, the orthographic projection of one first electrode block 111 on the first substrate 101 or the second substrate 102 at least partially overlaps with the orthographic projection of the one corresponding second electrode block 121 on the first substrate 101 or the second substrate 102, so as to improve the stability of the electrical connection between the first electrode block 111 and the second electrode block 121. In addition, when providing a structure or component (such as the conductive block 190) that electrically connects the first electrode block 111 and the second electrode block 121 to each other, the overall preparation process of the touch panel 10 can also be simplified.

In some embodiments of the present disclosure, in the case that the touch panel 10 includes a display function, as illustrated in FIG. 1B, the touch panel 10 further includes a liquid crystal layer 104 located between the first substrate 101 and the second substrate 102 to provide a liquid crystal display panel.

For example, in the case that the touch panel is a liquid crystal display touch panel, the display data is written to the pixel electrode 131 of the display sub-pixel during the scanning period of the display phase, the potential of the pixel electrode 131 is maintained at the potential corresponding to the display data, and the pixel electrode 131 forms a driving electric field with the first electrode block 111 (to which the first common voltage is applied) on the first substrate 101, so that the driving electric field allows the liquid crystal molecules in the liquid crystal layer 104 to deflect, so as to allow the display sub-pixel to emit light according to the required gray scale. Detailed description of the writing process of the display data may refer to the conventional design, which will not be detailed here.

It should be noted that in other embodiments of the present disclosure, in the case that the touch panel 10 includes a display function, the touch panel 10 may also be a light-emitting diode display (OLED) panel with a touch function, a quantum dot light-emitting diode display (QLED) panel with a touch function, or the like, which is not limited by the embodiments of the present disclosure.

For example, in the case that the touch panel is an OLED touch panel, each display sub-pixel includes, for example, a pixel circuit and an OLED light-emitting component. The pixel circuit is, for example, a common 2T1C circuit (including two transistors and one storage capacitor) or a circuit with a compensation function, and the pixel circuit is electrically connected with a corresponding gate line and a corresponding data line, so that according to the scanning signal on the gate line and the data signal on the data line, a driving current for driving the OLED to emit light is generated. The display data (signal) is written to the pixel circuit and stored in the pixel circuit during the scanning period of the display phase, and the OLED light-emitting component emits light under the drive of the pixel circuit according to the required gray scale. Detailed description of the writing process of display data may refer to the conventional design, which will not be repeated in detail here. In this case, the switch component which is directly in electrical connection to the pixel electrode is, for example, a driving transistor or a light-emitting control transistor.

In some embodiments of the present disclosure, the first electrode pattern layer 110, the second electrode pattern layer 120, and the third electrode pattern layer 130 may be transparent electrode layers, so that the touch panel 10 with the display function can realize transparent display. Further, in the case that the touch panel 10 realizes transparent display, the transparent display provided by the touch panel 10 may cooperate with the double-sided touch function to further improve the user experience. For example, the user can perform the touch operation on the first display side and/or the second display side opposite to the first display side according to actual needs, so as to improve flexibility and sensitivity of the touch operation.

It should be noted that in the case that the touch panel 10 realizes transparent display, other structures in the touch panel 10, such as the base substrate 1011 of the first substrate 101, the base substrate 1021 of the second substrate 102, the switch component 150, or the like, may also adopt suitable transparent materials (such as a transparent conductive material, a transparent insulating material, etc.) according to actual needs, which is not repeated here in the embodiments of the present disclosure.

It should be noted that in the above embodiments of the present disclosure, the second electrode pattern layer 120 and the third electrode pattern layer are located in different layers, so that a vertical touch capacitance is formed between the second electrode block 121 and the third electrode block 131 in the direction R1 in which the first substrate 101 and the second substrate 102 are opposite to each other.

In other embodiments of the present disclosure, the second electrode pattern layer 120 and the third electrode pattern layer 130 may also be located in the same layer, so that a horizontal touch capacitance is formed between the second electrode block 121 and the third electrode block 131 in a direction parallel to the surface of the first substrate 101 or the second substrate 102. The embodiments of the present disclosure do not limit the direction of the electric field forming the touch capacitance.

It should be noted that the touch panel 10 may further include other structures, layers or components. For example, these structures, layers or components may adopt the existing conventional design, which will not be described in detail here.

At least one embodiment of the present disclosure further provides a driving method of the touch panel provided by any one of the embodiments of the present disclosure, and the method includes: in a touch phase, providing a periodic touch driving signal to the plurality of second electrode blocks and receiving a touch detection signal from the plurality of second electrode blocks through the plurality of touch lead lines, respectively, and providing a second common voltage signal to the plurality of third electrode blocks or allowing the plurality of third electrode blocks to be in a floating state.

Figure 6:
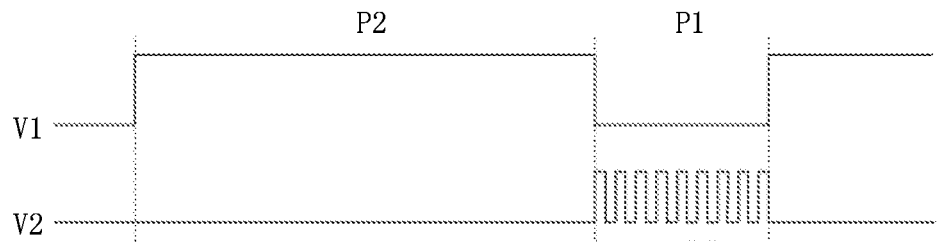
FIG. 6 is a signal timing diagram of a touch panel provided by at least one embodiment of the present disclosure.

FIG. 5 is a flowchart of a driving method of a touch panel provided by at least one embodiment of the present disclosure, and FIG. 6 is a signal timing diagram of a touch panel provided by at least one embodiment of the present disclosure.

For example, V1 shown in FIG. 6 represents the electrical signal applied to the third electrode block (that is, the pixel electrode) in the touch phase P1 and display phase P2, and V2 shown in FIG. 6 represents the electrical signal applied to the first electrode block and the second electrode block through the touch lead line in the touch phase P1 and display phase P2.

In some embodiments of the present disclosure, taking the touch panel 10 shown in FIG. 1B as an example, combined with FIG. 5 and FIG. 6, the driving method of the touch panel 10 may include the following steps S110 and S120.

Step S110: in a touch phase P1, providing a periodic touch driving signal to the plurality of second electrode blocks 121 and receiving a touch detection signal from the plurality of second electrode blocks 121 through the plurality of touch lead lines 140, respectively, and providing a second common voltage signal to the plurality of third electrode blocks 131 or allowing the plurality of third electrode blocks 131 to be in a floating state.

For example, the scanning signal and the second common voltage signal are provided to the pixel circuit (for example, the switch component) of the display sub-pixel through the gate line and the data line, respectively, thereby providing the second common voltage signal to the third electrode block 131 that is further used as the pixel electrode. For example, the second common voltage signal corresponds to a data signal with a gray scale of 0 (for example, a value range of 0 to 256). Alternatively, the scanning signal is provided to the pixel circuit (for example, the switch component) of the display sub-pixel through the gate line, so that the pixel circuit (for example, the switch component) is in the turn-off/cut-off state, and thus the third electrode block 131 that is further used as the pixel electrode is in the floating state.

Step S120: in a display phase P2, providing a first common voltage signal to the plurality of first electrode blocks 111 through the plurality of touch lead lines 140, respectively, and providing a display driving signal to the plurality of third electrode blocks 131.

For example, the scanning signal and the data signal are provided to the pixel circuit (for example, the switch component) of the display sub-pixel through the gate line and the data line, respectively, so as to provide a display driving signal to the third electrode block 131 that is further used as the pixel electrode, so that the pixel electrode is charged and forms a driving electric field between the first substrate 101 and the second substrate 102 with the first electrode block 111, and the liquid crystal molecules between the first substrate 101 and the second substrate 102 are driven to deflect to realize the display operation of the gray scale corresponding to the data signal.

For example, the second electrode block 121 may respond to the signal rising edge and the signal falling edge of the signal V2 in FIG. 6 to detect the capacitance change on the second electrode block 121, thereby realizing the touch operation.

At least one embodiment of the present disclosure further provides a display device, and the display device includes the touch panel (touch display panel) with a display function according to any one of the embodiments of the present disclosure, such as the touch panel 10 in the embodiment shown in FIG. 1B above.

Figure 7:
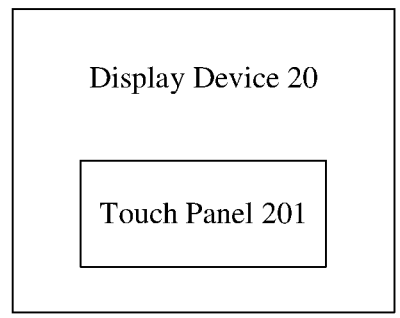
FIG. 7 is a schematic block diagram of a display device provided by at least one embodiment of the present disclosure.

FIG. 7 is a schematic block diagram of a display device provided by at least one embodiment of the present disclosure.

For example, as illustrated in FIG. 7, the display device 20 includes a touch panel 201, and the touch panel 201 may be a touch panel with a display function provided by any one of the embodiments of the present disclosure, such as the touch panel 10 in the embodiment shown in FIG. 1B above.

For example, the display device 20 can realize the display function and the touch function at the same time. The display device 20 may be a liquid crystal display device, an organic light-emitting diode (OLED) display device, a quantum dot light-emitting diode (QLED) display device, an electronic paper display device, or the like. The embodiments of the present disclosure are not limited in this aspect.

Figure 8:
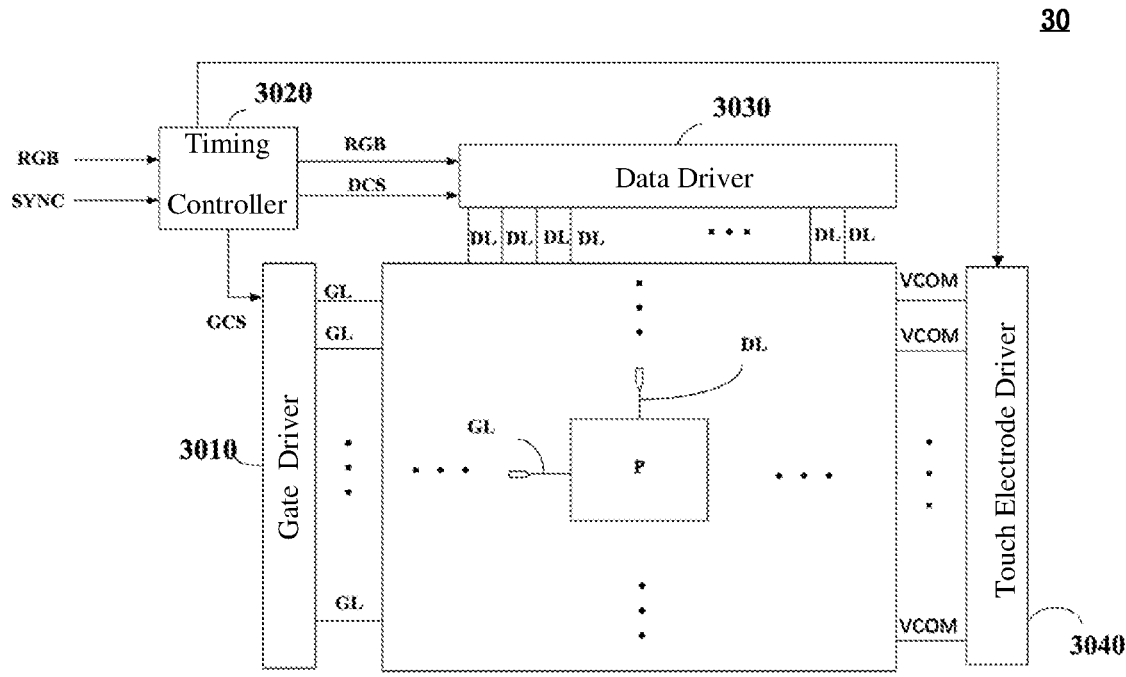
FIG. 8 is a schematic block diagram of another display device provided by at least one embodiment of the present disclosure.

FIG. 8 is a schematic block diagram of another display device provided by at least one embodiment of the present disclosure. For example, as illustrated in FIG. 8, the display device 30 includes a touch panel, and the touch panel includes a plurality of display sub-pixels P arranged in an array. For example, the touch panel may be a touch panel with a display function provided by any one of the embodiments of the present disclosure. For example, the specific structure of the touch panel may refer to the corresponding contents in the above embodiments of the touch panel 10 shown in FIG. 1B, which will not be repeated here.

For example, the display device 30 further includes a gate driver 3010, a timing controller 3020, and a data driver 3030. The gate driver 3010 is configured to drive a plurality of scanning lines GL to provide the gate scanning signal. The data driver 3030 is configured to drive a plurality of data lines DL to provide the display data (data signal). For example, the data driver 3030 includes a display controller, and the data signal is provided to the plurality of data lines DL under control of the display scanning signal provided by the display controller. The timing controller 3020 is configured to process the image data RGB input from the outside of the touch display device 30, provide the processed image data RGB to the data driver 3030, and output the scanning control signal GCS and data control signal DCS to the gate driver 3010 and the data driver 3030 to control the gate driver 3010 and the data driver 3030.

For example, the gate driver 3010 is correspondingly connected with the plurality of scanning lines GL. The plurality of scanning lines GL are correspondingly connected with the display sub-pixels P arranged in an array. The gate driver 3010 sequentially outputs gate scanning signals to the plurality of scanning lines GL to enable the display sub-pixels P in a plurality of rows to be scanned row by row. For example, the gate driver 3010 may be implemented as a semiconductor chip or may be integrated on, for example, the second substrate of the touch panel of the display device 30 to form a GOA circuit.

For example, the data driver 3030 uses the reference gamma voltage to convert the digital image data RGB input from the timing controller 3020 into a data signal according to the plurality of data control signals DCS from the timing controller 3020. For example, the converted data signal is provided to the plurality of data lines DL under control of the display scanning signal provided by the display controller. For example, the data driver 3030 may be implemented as a semiconductor chip.

For example, the timing controller 3020 processes the externally input image data RGB to match the size and resolution of the display structure 410, and then provides the processed image data to the data driver 3030. The timing controller 3020 generates the plurality of scanning control signals GCS and the plurality of data control signals DCS using synchronization signals (such as a dot clock (DCLK), a data enable signal (DE), a horizontal synchronization signal (Hsync), and a vertical synchronization signal (Vsync)) input from the outside of the display device 30. The timing controller 3020 provides the generated scanning control signals GCS and data control signals DCS to the gate driver 3010 and the data driver 3030 respectively for the control of the gate driver 3010 and the data driver 3030.

For example, the display device 30 further includes a touch electrode driver 3040. The touch electrode driver 3040 is used to drive a plurality of touch lead lines VCOM to respectively provide periodic touch driving signals to the plurality of second electrode blocks on the second substrate and to receive touch detection signals from the plurality of second electrode blocks, thereby enabling the display device 30 to perform corresponding touch operations. For example, the touch electrode driver 3040 includes a controller (for example, referring to the controller 103 in the above embodiments). Under control of, for example, the control signal provided by the timing controller 3020, the touch electrode driver 3040 allows the controller to apply an electrical signal for the touch operation to the second electrode blocks through the plurality of touch lead lines VCOM. For example, the touch electrode driver 3040 may be implemented as a semiconductor chip.

It should be noted that the display device 30 may further include other components, such as a signal decoding circuit, a voltage conversion circuit, etc. For example, these components may adopt existing conventional components, which will not be described in detail here.

For example, the above display device 20 and display device 30 may be any product or component with a display function and a touch function, such as a display substrate, a display panel, an electronic paper, a mobile phone, a tablet computer, a TV, a display, a notebook computer, a digital photo frame, a navigator, or the like, which is not limited by the embodiments of the present disclosure.

The specific description and technical effect of the display device 20 and the display device 30 provided by the embodiments of the present disclosure may refer to the corresponding content of the touch panel provided by the embodiments of the present disclosure, for example, the corresponding content of the touch panel 10 in the above embodiments, which will not be repeated here.

For the present disclosure, the following statements should be noted:

(1) The accompanying drawings related to the embodiment(s) of the present disclosure involve only the structure(s) in connection with the embodiment(s) of the present disclosure, and other structure(s) can be referred to common design(s).

(2) For the purpose of clarity, in accompanying drawings for illustrating the embodiment(s) of the present disclosure, the thickness of a layer or a region may be enlarged or narrowed, that is, the drawings are not drawn in a real scale. However, it should be understood that, in the case that a component such as a layer, a film, a region, a substrate, or the like is referred to be "on" or "under" another component, the component may be "directly" "on" or "under" the another component, or an intermediate component may be disposed therebetween.

(3) In case of no conflict, the embodiments of the present disclosure and features in one embodiment or in different embodiments can be combined to obtain new embodiments.

What have been described above merely are specific implementations of the present disclosure, and the protection scope of the present disclosure is not limited thereto. Any modifications or substitutions that easily occur to those skilled in the art within the technical scope of the present disclosure should be within the protection scope of the present disclosure. Therefore, the protection scope of the present disclosure should be based on the protection scope of the claims.

What is claimed is:

1. A touch panel, comprising:
   a first substrate; and
   a second substrate, being opposite to the first substrate and overlapping with the first substrate,
   wherein the first substrate comprises a first electrode pattern layer, the first electrode pattern layer comprises a plurality of first electrode blocks, and the plurality of first electrode blocks are insulated from each other and arranged in a first array with a plurality of rows and a plurality of columns; and
   the second substrate comprises:
     a second electrode pattern layer, comprising a plurality of second electrode blocks, wherein the plurality of second electrode blocks are insulated from each other and arranged in a second array with a plurality of rows and a plurality of columns;
     a plurality of touch lead lines, wherein the plurality of second electrode blocks correspond to and are electrically connected with the plurality of first electrode blocks, respectively, and the plurality of second electrode blocks are respectively electrically connected with the plurality of touch lead lines to process an electrical signal of a touch operation; and
     a third electrode pattern layer, comprising a plurality of third electrode blocks, wherein the plurality of third electrode blocks are insulated from each other and arranged in a third array with a plurality of rows and a plurality of columns, and the plurality of second electrode blocks are insulated from the plurality of third electrode blocks to form a plurality of touch capacitors, respectively.

2. The touch panel according to claim 1, wherein the plurality of second electrode blocks and the plurality of first electrode blocks correspond to each other, and the plurality of second electrode blocks are electrically connected with the plurality of first electrode blocks in one-to-one correspondence.

3. The touch panel according to claim 1, wherein the second electrode pattern layer and the third electrode pattern layer are in different layers on the second substrate; and
    in a direction in which the first substrate and the second substrate are opposite to each other, each of the plurality of second electrode blocks at least partially overlaps with at least one third electrode block to form a touch capacitor.

4. The touch panel according to claim 1, wherein the first electrode pattern layer is on a side of the first substrate close to the second substrate, and the second electrode pattern layer and the third electrode pattern layer are on a side of the second substrate close to the first substrate.

5. The touch panel according to claim 1, wherein the second substrate is a display array substrate, the first substrate is an opposite substrate, and the first substrate and the second substrate further work together to provide a display function;
    the second substrate further comprises a plurality of display sub-pixels arranged in an array, and each of the plurality of display sub-pixels comprises a pixel electrode and a switch component electrically connected with the pixel electrode; and
    each of the plurality of third electrode blocks is further used as a pixel electrode of one display sub-pixel, and the plurality of touch lead lines further transmit a first common voltage signal for a display operation.

6. The touch panel according to claim 5, wherein the pixel electrode is on a side of the second electrode block close to the first substrate, and the switch component is on a side of the second electrode block away from the first substrate; and
    the second electrode block comprises an opening, and the pixel electrode is electrically connected to the switch component through the opening.

7. The touch panel according to claim 5, wherein the switch component comprises an active layer, a first electrode electrically connected to a first electrode region of the active layer, and a second electrode electrically connected to a second electrode region of the active layer,
    the first electrode is connected to the pixel electrode through a via hole, and
    an orthographic projection of the second electrode on the first substrate or the second substrate at least partially overlaps with an orthographic projection of one second electrode block on the first substrate or the second substrate.

8. The touch panel according to claim 5, further comprising a controller,
    wherein the controller is configured to, respectively through the plurality of touch lead lines, provide a touch driving signal to the plurality of second electrode blocks and receive a touch detection signal from the plurality of second electrode blocks in a touch phase; and the plurality of third electrode blocks are configured to receive a second common voltage signal or be floated in the touch phase to enable the touch operation.

9. The touch panel according to claim 8, wherein the controller is further configured to, respectively through the plurality of touch lead lines, provide the first common voltage signal to the plurality of second electrode blocks in a display phase.

10. The touch panel according to claim 1, further comprising a plurality of conductive blocks,
    wherein the plurality of conductive blocks are between the first substrate and the second substrate, and each of the plurality of conductive blocks is in electrical contact with a corresponding first electrode block and a corresponding second electrode block, respectively, to allow the corresponding first electrode block to be electrically connected to the corresponding second electrode block.

11. The touch panel according to claim 10, wherein the first substrate further comprises a black matrix,
    the black matrix comprises a plurality of black matrix strips,
    the plurality of black matrix strips are configured to define a plurality of opening regions, and
    an orthographic projection of the conductive block on the first substrate or the second substrate at least partially overlaps with an orthographic projection of the black matrix strip on the first substrate or the second substrate.

12. The touch panel according to claim 10, wherein the conductive block comprises a conductive ball.

13. The touch panel according to claim 10, further comprising a first insulating layer,
    wherein the first insulating layer covers other portions of the second electrode pattern layer except for a portion of the second electrode pattern layer in contact with the plurality of conductive blocks.

14. The touch panel according to claim 10, wherein a height of the conductive block in a direction in which the first substrate and the second substrate are opposite to each other is greater than a minimum distance between the first substrate and the second substrate.

15. The touch panel according to claim 1, wherein the plurality of touch lead lines are on a side of the second electrode pattern layer away from the first substrate, and the plurality of touch lead lines are electrically connected with the plurality of second electrode blocks through a plurality of via holes, respectively.

16. The touch panel according to claim 1, wherein an orthographic projection of one first electrode block on the first substrate or the second substrate at least partially overlaps with an orthographic projection of a corresponding second electrode block on the first substrate or the second substrate.

17. The touch panel according to claim 1, wherein the first electrode pattern layer, the second electrode pattern layer, and the third electrode pattern layer are transparent electrode layers.

18. The touch panel according to claim 1, wherein the second electrode pattern layer and the third electrode pattern layer are in an identical layer.

19. A display device, comprising the touch panel according to claim 1.

20. A driving method of a touch panel, wherein the touch panel comprises a first substrate and a second substrate, being opposite to the first substrate and overlapping with the first substrate; the first substrate comprises a first electrode pattern layer, the first electrode pattern layer comprises a plurality of first electrode blocks, and the plurality of first electrode blocks are insulated from each other and arranged in a first array with a plurality of rows and a plurality of columns; the second substrate comprises a second electrode pattern layer, a plurality of touch lead lines, and a third electrode pattern layer; the second electrode pattern layer comprises a plurality of second electrode blocks, wherein the plurality of second electrode blocks are insulated from each other and arranged in a second array with a plurality of rows and a plurality of columns; the plurality of second electrode blocks correspond to and are electrically connected with the plurality of first electrode blocks, respectively, and the plurality of second electrode blocks are respectively electrically connected with the plurality of touch lead lines to process an electrical signal of a touch operation; the third electrode pattern layer comprises a plurality of third electrode blocks, wherein the plurality of third electrode blocks are insulated from each other and arranged in a third array with a plurality of rows and a plurality of columns, and the plurality of second electrode blocks are insulated from the plurality of third electrode blocks to form a plurality of touch capacitors, respectively; and the method comprises:

in a touch phase, providing a periodic touch driving signal to the plurality of second electrode blocks and receiving a touch detection signal from the plurality of second electrode blocks through the plurality of touch lead lines, respectively, and providing a second common voltage signal to the plurality of third electrode blocks or allowing the plurality of third electrode blocks to be in a floating state.

* * * * *